(12) United States Patent
Liisberg et al.

(10) Patent No.: US 10,409,666 B2
(45) Date of Patent: Sep. 10, 2019

(54) METHOD AND DEVICE FOR GENERATING AN OUTPUT DATA STREAM

(71) Applicant: Robert Bosch GmbH, Stuttgart (DE)

(72) Inventors: Mikkel Liisberg, Stuttgart (DE);
Carsten Gebauer, Boeblingen (DE);
Roland Schleser, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 93 days.

(21) Appl. No.: 15/271,496

(22) Filed: Sep. 21, 2016

(65) Prior Publication Data

US 2017/0091011 A1    Mar. 30, 2017

(30) Foreign Application Priority Data

Sep. 30, 2015   (DE) ........................ 10 2015 218 890

(51) Int. Cl.
*G06F 11/07* (2006.01)
*G06F 11/16* (2006.01)
*H04L 1/24* (2006.01)

(52) U.S. Cl.
CPC ........ *G06F 11/079* (2013.01); *G06F 11/0724* (2013.01); *G06F 11/0751* (2013.01); *G06F 11/16* (2013.01); *H04L 1/24* (2013.01)

(58) Field of Classification Search
CPC ............. G06F 11/3644; G06F 11/3692; G06F 11/3604; G06F 17/3053; G06F 17/30516; H04B 7/0417; H04B 7/0413; B60W 30/00
See application file for complete search history.

(56) References Cited

U.S. PATENT DOCUMENTS

| 6,853,728 | B1* | 2/2005 | Kahn ..................... H04N 5/913 |
| | | | 348/E7.056 |
| 7,000,241 | B2* | 2/2006 | Klauss ................... H04N 7/163 |
| | | | 348/474 |
| 7,440,982 | B2* | 10/2008 | Lu ....................... G06F 11/1448 |
| 7,921,267 | B1* | 4/2011 | Yadav et al. .................. 711/162 |
| 9,134,731 | B2* | 9/2015 | Healey ..................... G07C 5/00 |
| 9,610,949 | B2* | 4/2017 | Healey ................. B60W 30/12 |
| 9,709,679 | B1* | 7/2017 | Urmson ................ G01C 21/32 |
| 2011/0095879 | A1* | 4/2011 | Heracles ............... B60W 40/09 |
| | | | 340/441 |
| 2012/0221610 | A1* | 8/2012 | Murphy et al. ............... 707/825 |
| 2012/0236949 | A1* | 9/2012 | Keating et al. ............... 375/259 |
| 2013/0253753 | A1* | 9/2013 | Burnette ............. G06K 9/2036 |
| | | | 701/26 |
| 2015/0158486 | A1* | 6/2015 | Healey ................. B60W 30/12 |
| | | | 701/23 |

(Continued)

FOREIGN PATENT DOCUMENTS

DE           10332700 A1    1/2005

*Primary Examiner* — Nadeem Iqbal
(74) *Attorney, Agent, or Firm* — Norton Rose Fulbright US LLP; Gerard Messina (57) ABSTRACT

A method for generating an output data stream from an input data stream, a processing unit receives a first input data stream including a first data set, and this processing unit receives, from a further processing unit, a second set of metadata, which describes a second data set of a second input data stream of this further processing unit, the processing unit outputs or does not output, as a function of the second set of metadata, an output data set of the output data stream generated from the first data set.

16 Claims, 5 Drawing Sheets

(56) References Cited

U.S. PATENT DOCUMENTS

2016/0321468 A1* 11/2016 Stankiewicz et al. ........................ G06F 21/6254
2017/0300372 A1* 10/2017 Andreopoulos ........ G06F 21/54

* cited by examiner

METHOD AND DEVICE FOR GENERATING AN OUTPUT DATA STREAM

CROSS REFERENCE

The present application claims the benefit under 35 U.S.C. § 119 of German Patent Application No. DE 102015218890.6 filed on Sep. 30, 2015, which is expressly incorporated herein by reference in its entirety.

FIELD

The present invention relates to a method for generating an output data stream from an input data stream and to a system, a computer program, and a machine-readable memory medium for carrying out the method.

BACKGROUND INFORMATION

German Patent No. DE 10332700 A1 describes a method for switching between at least two operating modes of a processing unit including at least two execution units, wherein a switch between a first operating mode to a second operating mode is triggered by the processing unit accessing a predefined memory address.

SUMMARY

An increasing number of applications, for example, in the area of highly automated driving, require calculations to be performed, which must satisfy high demands regarding safety integrity and performance.

In the area of embedded safety systems, one possible measure is to ensure the correct execution of calculations with the aid of hardware-based or software-based self-tests. However, protecting the required processing units themselves is quite complex.

Another option for nevertheless ensuring a high quota of safe failures is the multiple execution of the calculations on multiple processing units having a downstream comparator for ensuring the calculation integrity, i.e., detection of deviations. "Safe failures" are understood here as failures that either are inherently safe (i.e., whose occurrence has no compromising consequences), or are detected.

In order to ensure enhanced independence of the processing units, they may be spatially separated. One difficulty is to ensure that the processing units work with identical data, since otherwise the comparator diagnoses an error.

Furthermore, if transmission errors, i.e., erroneously or incompletely transmitted or missing data packets, must also be handled on one of the processing units, then such errors may result in individual comparator errors or, if the individual processing units change their status as a function of the input data (known as "persistence"), in permanent errors and thus a total failure (i.e., in a forced transition to a safe status). Depending on the frequency of transmission errors, this may result in severe limitation of availability.

In a first aspect of the present invention, a method for generating an output data stream from an input data stream is provided, in which a processing unit receives a first input data stream including a first data set. Furthermore, it is provided that this processing unit receives, from a further processing unit, a second set of metadata which describes a second data set of a second input data stream of this further processing unit; the processing unit outputs or does not output an output data set of the output data stream generated from the first data set, depending on the second set of metadata.

The second set of metadata may contain the information of whether or not the second data set is present. The term "data set," in particular, may be understood so broadly that it includes an empty data set, so that, for example, in the case of protocols whose input data stream is situated in a fixed grid, the processing unit may recognize, by the presence of an empty data set, that no data set is present.

In particular, it may be provided that the processing unit then, and in particular, precisely then, outputs an output data set of the output data stream generated from the first data set when the second set of metadata indicates that the second data set is present.

This method has the advantage that the processing unit is able to ascertain, using few resources, whether its input data stream and the input data stream of the further processing unit are consistent. In particular, this method results in only a very small additional latency.

In a particularly flexible refinement of this aspect, a method for generating an output data stream from an input data stream may be provided. In this case, it is provided that a processing unit has a first set of metadata, which describes a first, in particular, currently present, preferably safety-tested data set of a first input data stream of this unit, and this processing unit receives, from a further processing unit of the system, a second set of metadata, which describes a second, in particular, currently present, preferably safety-tested data set of a second input data stream of this further processing unit.

In this case, it is provided that the processing unit outputs or does not output an output data set of the output data stream generated from the first data set as a function of a result of a comparison of the first data with the second data.

The first and second set of metadata may be an ID number of the data set or a hash of the contents of the data set in particular, or also contain the information of whether or not the data set is present. The term "data set" in particular, may be understood so broadly that it includes an empty data set, so that, in the case of protocols whose input data stream is situated in a fixed grid, the processing unit may recognize, by the presence of an empty data set, that no data set is present.

Building on this basis, it may be easily achieved in particular that the processing units output consistent data streams if the processing unit outputs the output data set then, in particular, precisely then, when the first set of metadata describing this data set is identical to the second set of metadata describing the second data set.

In one particularly efficient refinement having a particularly good worst-case latency time it may be provided that the processing unit may generate the output data set from the first data set as a function of the result of the comparison and generates it in particular only when it has been decided that the output data set will also be output.

In one alternative refinement it may be provided that the processing unit generates the first output data set from the first data set independently from the result of the comparison. In particular, when the processing unit and the further processing unit work asynchronously, it may thus be achieved that the first processing unit is able to generate the output data set even prior to the performance of the comparison. However, in order to prevent inconsistent output data streams from being output, the output of the output data set is to be held back until the result of the comparison is received.

The best-case latency is improved due to this method, but the worst-case latency is made worse. This is due to the fact that this method may mean that the output data set is not output when, on the basis of the result of the comparison, it is decided that the output data set will not be output, and the processing unit is reset to the state in which it was prior to the start of the generation of the first data set. This is important in particular when the above-mentioned persistences are present.

In a further aspect, the processing unit may supply the output data stream generated by it to a comparator unit. This makes a check of a redundantly performed calculation particularly easy, in particular, when the comparator unit also receives an output data stream generated by the further processing unit also from this processing unit.

In a further aspect of the present invention it may be provided that the processing unit transfers the first set of metadata to the further processing unit. The method thus becomes particularly reliable, because this enables also the further processing unit to check its input data stream.

In a further aspect it may be provided that the processing unit and the further processing unit receive the first data stream and the second data stream from the same source. In particular, it may be provided that the first data stream and the second data stream have been transmitted from the source to the processing unit and to the further processing unit as the same data stream.

In a further aspect, the present invention relates to a system having at least two processing units, at least one of the processing units being designed to carry out all steps of the method according to the present invention.

In particular, this system may be designed in such a way that all processing units, i.e., in particular, all processing units that receive an input data stream and generate an output data stream therefrom, which they supply to a comparator, are designed to carry out all steps of one of the methods according to the present invention.

The output data set, which is not output, because the result of the comparison shows differences between the first set of metadata and the second set of metadata, is missing in the output data stream. However, this output data set is missing in the output data streams of all processing units. The comparator is thus unable to recognize an error in one of the processing units.

In a further aspect of the present invention, a system may be provided, which is designed to carry out the method, in which the processing unit supplies the output data stream it has generated to a comparator unit. In this case, the system may include the comparator unit. When the output data streams transmitted from the processing units to the comparator unit are not identical, the latter is designed to output an error message. As a response to this error message, the system may then be transferred to a safe mode, for example, which includes, for example, a shutdown of the output data stream. Such a system is particularly safe.

In a further aspect of the present invention, the system may include a network via which the metadata are exchanged. The network may be designed in particular in a ring architecture or having a central node. Such a network limits the number of required connections between the processing units. This is advantageous, in particular, in the case of a great number of such processing units.

Alternatively, the network may be configured in such a way that metadata are exchanged via broadcast or multicast messages. In particular, the network may then be an Ethernet network. This reduces the required point-to-point bandwidth.

In further aspects, the present invention relates to a computer program for carrying out the method and a machine-readable memory medium on which the computer program is stored. The method may be used in a motor vehicle, for example.

The figures show particularly advantageous specific embodiments of the present invention.

DETAILED DESCRIPTION OF EXAMPLE EMBODIMENTS

Figure 1:
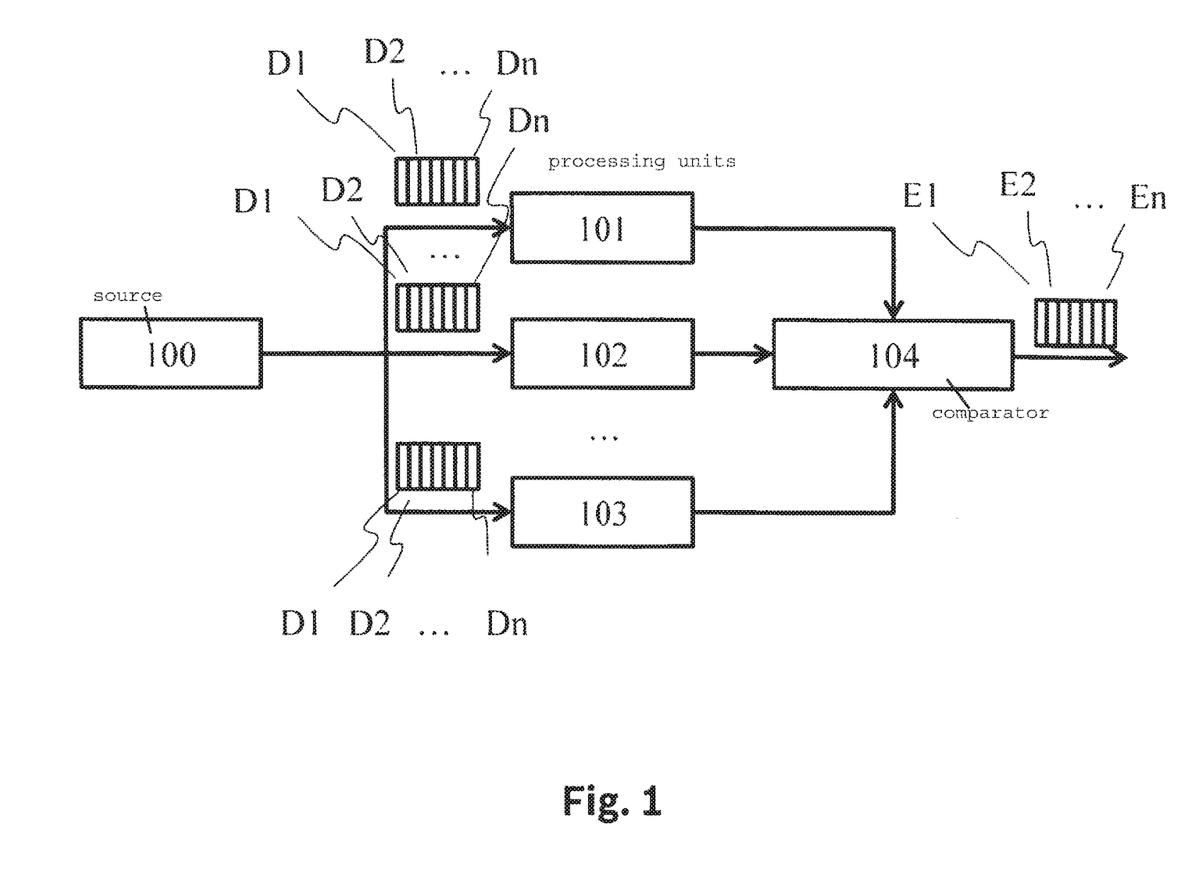
FIG. 1 shows the structure of a system including multiple processing units.

FIG. 1 shows, as an example, a system including multiple processing units 101, 102, 103. A source 100 transmits an input data stream composed of data sets D1, D2, . . . , Dn to each of processing units 101, 102, 103. Processing units 101, 102, 103 process these data sets D1, D2, . . . , Dn in parallel and generate an output data stream composed of output data sets E1, E2, . . . , En. Limitation to three processing units 101, 102, 103 is not necessary. Any number of processing units may be used connected appropriately in parallel.

In particular, it may be provided that an output data set, for example, D2, of the output data stream is generated from a data set of the input data stream, for example, E1. In this case there is a 1:1 correspondence between the data sets of the input data stream and the output data sets of the output data stream. Processing units 101, 102, 103 process data sets D1, D2, . . . , Dn in parallel according to the same calculation rule. This means that, in the error-free case, each of the processing units 101, 102, 103 receives the same input data stream. In the error-free case, the generated output data streams are also identical, i.e., the individual output data sets of the output data streams are identical.

Using additional functions of processing units 101, 102, 103, for example, it is possible that processing units 101, 102, 103 work asynchronously. However, the 1:1 correspondence between the data sets of the input data stream and the output data sets of the output data stream is preserved. In the error-free case, there is a 1:1 correspondence between the output data sets of the output data streams. Accordingly, a 1:1 correspondence between the data sets of the input data streams therefore exists even in the case of asynchronicity.

Processing unit 101, 102, 103 transmits this output data stream to a comparator 104. Comparator 104 checks whether the corresponding output data sets E1, E2, . . . , En, received by comparator 104 from processing units 101, 102, 103 are identical. If this is the case, the corresponding output data set E1, E2, . . . , En is output. In the error-free case, output data stream. E1, E2, . . . , En is ascertained from the input data stream D1, D2, . . . , Dn received from source 100. The calculation result, i.e., output data stream E1, E2, . . . , En is safeguarded by the redundant calculation by processing units 101, 102, 103.

If comparator 104 determines that at one point of the output data stream the corresponding data sets received by comparator 104 from processing units 101, 102, 103 are not identical, it is inferred that that there is an error in one of processing units 101, 102, 103, and the system is transferred to a safe mode. If the method is used in a motor vehicle, a traveling speed of the motor vehicle may be reduced, for example, or certain safety-critical functions that use output data sets E1, E2, . . . , En are de-activated.

However, it is also possible that processing units 101, 102, 103 work error-free, and there is only a (for example, transient) error in a transmission line from source 100 to one of processing units 101, 102, 103. If, for example, no data set or an erroneous data set instead of data set D2 is transmitted to processing unit 102 due to a data loss at this point of the data stream, the corresponding output data set E2 is also erroneous. The comparator would then determine, by comparing output data sets E2 received from processing units 101, 102, 103 that output data sets E2 are not all identical, and then discern that there is an error in one of processing units 101, 102, 103.

If processing units 101, 102, 103 are transferred to a certain internal state as a function of the received data sets, in particular, as a function of data set D2, in this case the erroneous transmission of data set D2 would result in processing unit being transferred to an internal state different from that of processing units 101 and 103. This may result in that not only output data set E2 generated by processing unit 102, but also the subsequent output data sets will differ from the output data sets generated by the other processing units 101, 103. Due to this so-called persistence, an error in one of processing units 101, 102, 103 would thus be permanently detected, although all processing units 101, 102, 103 work error-free.

Figure 2:
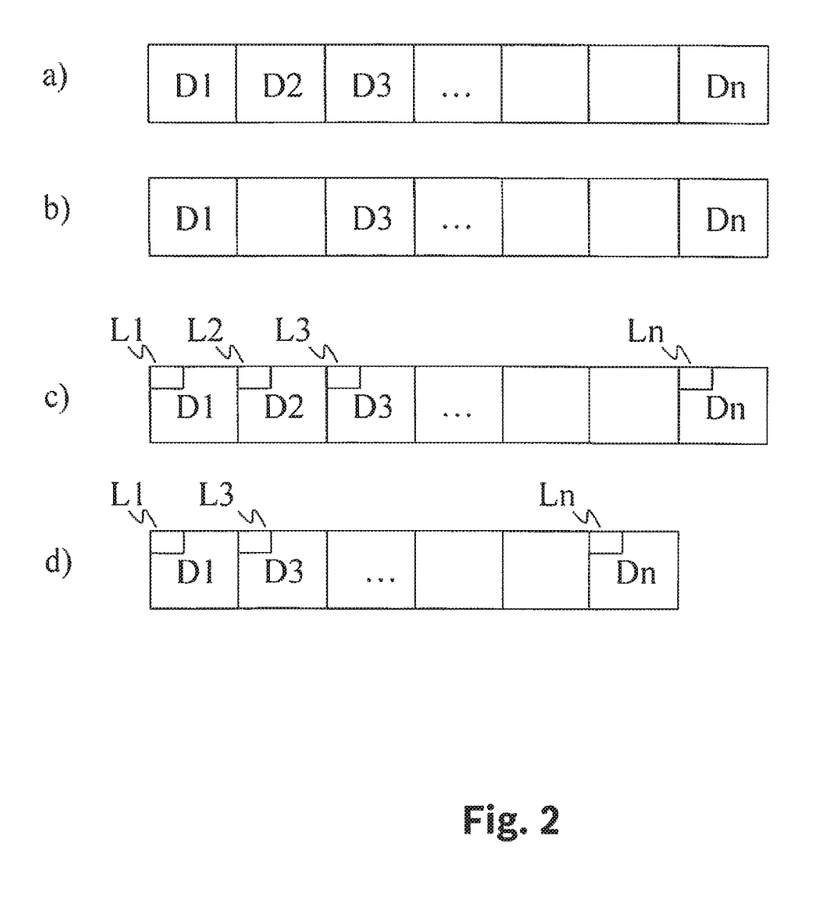
FIG. 2 shows different specific embodiments of a data stream.

FIG. 2 shows the possible format of data streams as they may be present here as input data streams or output data streams. The data stream is illustrated using the example of an input data stream having data sets D1, D2, D3, . . . , Dn, however, the format may be similar for the output data stream.

FIG. 2a shows a first possible format. The data stream is composed of windows having a fixedly predefinable width, for example, 64 bits. One of data sets D1, D2, D3, . . . , Dn is transmitted in each of these windows. By its placement in a certain window, each data set implicitly receives identification as first, second, third, etc. data set in the data stream.

FIG. 2b illustrates a case of error in a format of this type of the data stream. In the illustrated case of error, second data set D2 is missing, for example, due to a transmission error. All other data sets D1, D3, . . . , Dn are, however, still situated in their proper places in the data stream.

FIG. 2c illustrates a second possible format of a data stream. The data stream is composed of consecutive data sets D1, D2, D3, . . . , Dn (implemented, for example, as a chained list). An identifier L1, L2, L3, . . . , Ln is assigned to each data set. This identifier may indicate, for example, the position of the data set in the data stream at the time the latter is generated. In this example it would then be L1=1, L2=2, etc.

FIG. 2d illustrates a case of error in a format of this type of the data stream. In the illustrated case of error, the second data set D2 is missing, for example, due to a transmission error. All other data sets are, however, still situated in their proper places in the data stream. If the identifiers are selected as in the example as consecutive integers without gap, from the fact that the identifier L3=3 (rather than the identifier L2=2) follows identifier L1=1, it may be inferred when the data stream is received that the second data set D2 is missing from this data stream.

Figure 3:
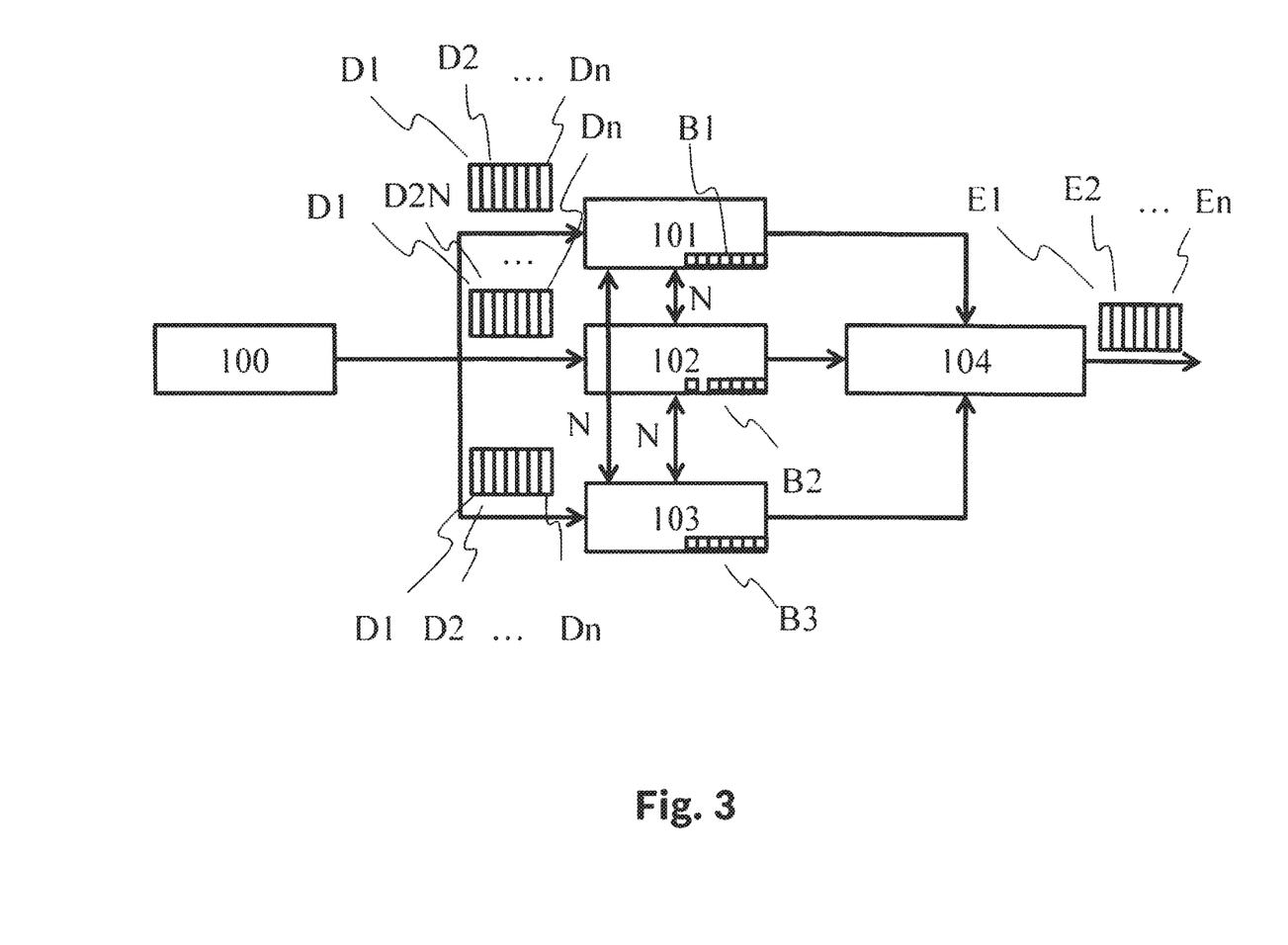
FIG. 3 shows the structure of a system according to the present invention according to one specific embodiment.

FIG. 3 illustrates one exemplary embodiment of the present invention. The setup of the system may be identical to that of the system illustrated in FIG. 1. In source 100, it may be provided that data sets D1, D2, . . . , Dn of the input data stream are subjected to a safety check.

Processing units 101, 102, 103 are interconnected by a communication network N, for example, an Ethernet network. Each processing unit 101, 102, 103 ascertains a bit mask B1, B2, B3. A bit mask is a sequence of bits. Each bit is bijectively assigned to a data set D1, D2, . . . , Dn of the input data stream, (for example, via its position in the bit mask). The bit indicates whether the assigned data set of the input data stream received from this processing unit 101, 102, 103 has been received. For example, the value "1" may signify that the corresponding data set has been received, and the value "0" may signify that the corresponding data set has not been received. Processing units 101, 102, 103 may interchange these bit masks over network N. It is also possible that only one of the processing units 101 receives the bit masks from the other processing units 102, 103. It is then possible that these processing units 102, 103 ensure, via alternative mechanisms, that the input data streams they receive are correct.

One bit of bit mask B1, B2, B3 represents a piece of metainformation on the particular data set D1, D2, Dn assigned to it. Instead of a bit, other types of metainformation are also possible, for example, a hash value of the data set D1, D2, . . . , Dn.

In the example illustrated here, data set D2 is missing from the input data stream of processing unit 102. This is indicated by reference sign D2N. Accordingly, bit mask B2 in second processing unit 102 has the value "0" at the second point. First processing unit 101 ascertains that bit mask B2 has the value "0" at the second point, and therefore does not transmit output data stream E2, which would be ascertained from data set D2, to comparator 104 if the bit mask had the value "1" at the second point. Otherwise this output data stream is unchanged with respect to the example illustrated in FIG. 1.

Therefore, comparator 104 receives from processing units 101, 102, and 103 an empty data set instead of output data set E2. Comparator 104 determines that these output data sets E2 are identical to each other and therefore does not discern an error, but outputs an empty data set instead of output data set E2.

This means that processing units 101, 102, 103 initially exchange metadata, i.e., information on data sets D1, D2, Dn available to them. Data sets D2N, which are not, or are incorrectly available to a processing unit 102, are not used by the other processing units 101, 103, i.e., are not taken into account when the output data stream to be transmitted is generated. The output data streams may thus be prevented from becoming inconsistent due to generation from different input data streams. Inconsistencies resulting from the processing unit being transferred to an internal state different from the internal state of the further processing unit due to a transmission error of the input data stream transmitted by it may also be prevented.

Figure 4:
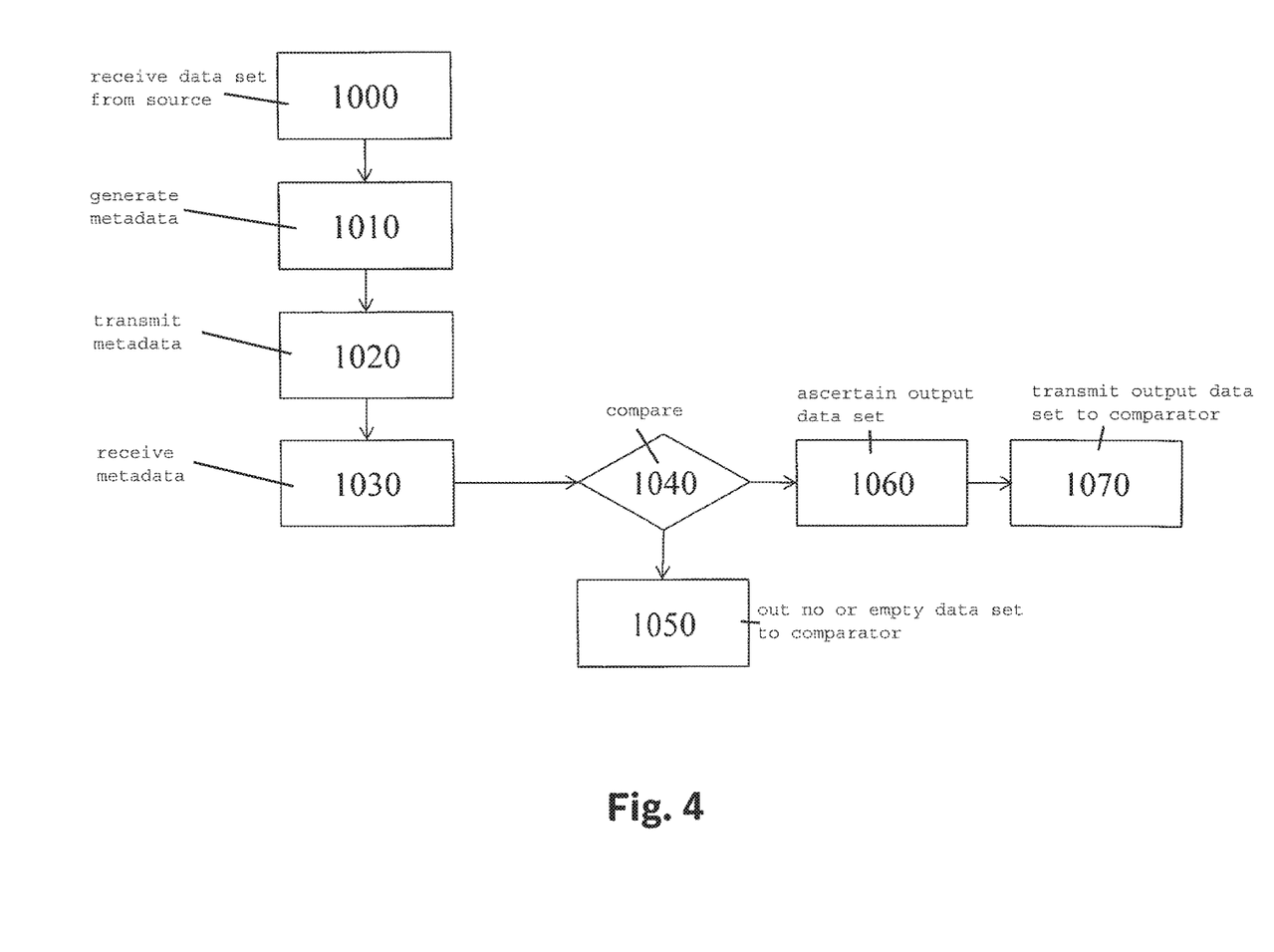
FIG. 4 shows the sequence of a method according to one specific embodiment of the present invention.

FIG. 4 shows a flow chart according to a first aspect of the present invention. This method may be used in one or more processing units 101, 102, 103, for example, in processing unit 101.

The method starts in step 1000. Processing unit 101 receives from source 100 the currently present data set, for example, D2.

In the following, optional step 1010, processing unit 101 generates metadata to data set D2. For example, as FIGS. 2c and 2d show, processing unit 101 generates a bit that indicates whether data set D2 is present.

In the following, optional step 1020, processing unit 101 transmits these metadata to the other processing units 102, 103.

In the following step 1030, processing unit 101 receives, from the other processing units 102, 103, metadata, which describe their currently present data sets.

If the metadata are a bit that indicates whether or not the information is present, processing unit 101 may decide in the following step 1040 as a function of the value of this bit, whether step 1050 or 1060 follows. If the value of the bit of at least one of processing units 102, 103 is "0," step 1050 follows, otherwise step 1060.

If these metadata are a hash value, for example, which encodes the information in data set D2, processing unit 101 may compare, in step 1040, the metadata it has generated to data set D2 with the metadata received from processing unit 102, 103. If the comparison of its own metadata with those received from one of the other processing units 102, 103 indicates that these metadata are different, step 1050 follows, otherwise step 1060.

In step 1050, processing unit 101 outputs no, or an empty, data set to comparator 104, and the method is terminated.

In step 1060, processing unit 101 ascertains output data set E2 from data set D2. If data set D2 is missing or data set D2 is empty, processing unit 101 ascertains no, or an empty, output data set.

In step 1070, processing unit 101 transmits output data set D2 to comparator 104. If no, or an empty output data set has been ascertained, processing unit 101 transmits no, or an empty data set to comparator 104, thus terminating the method.

Figure 5:
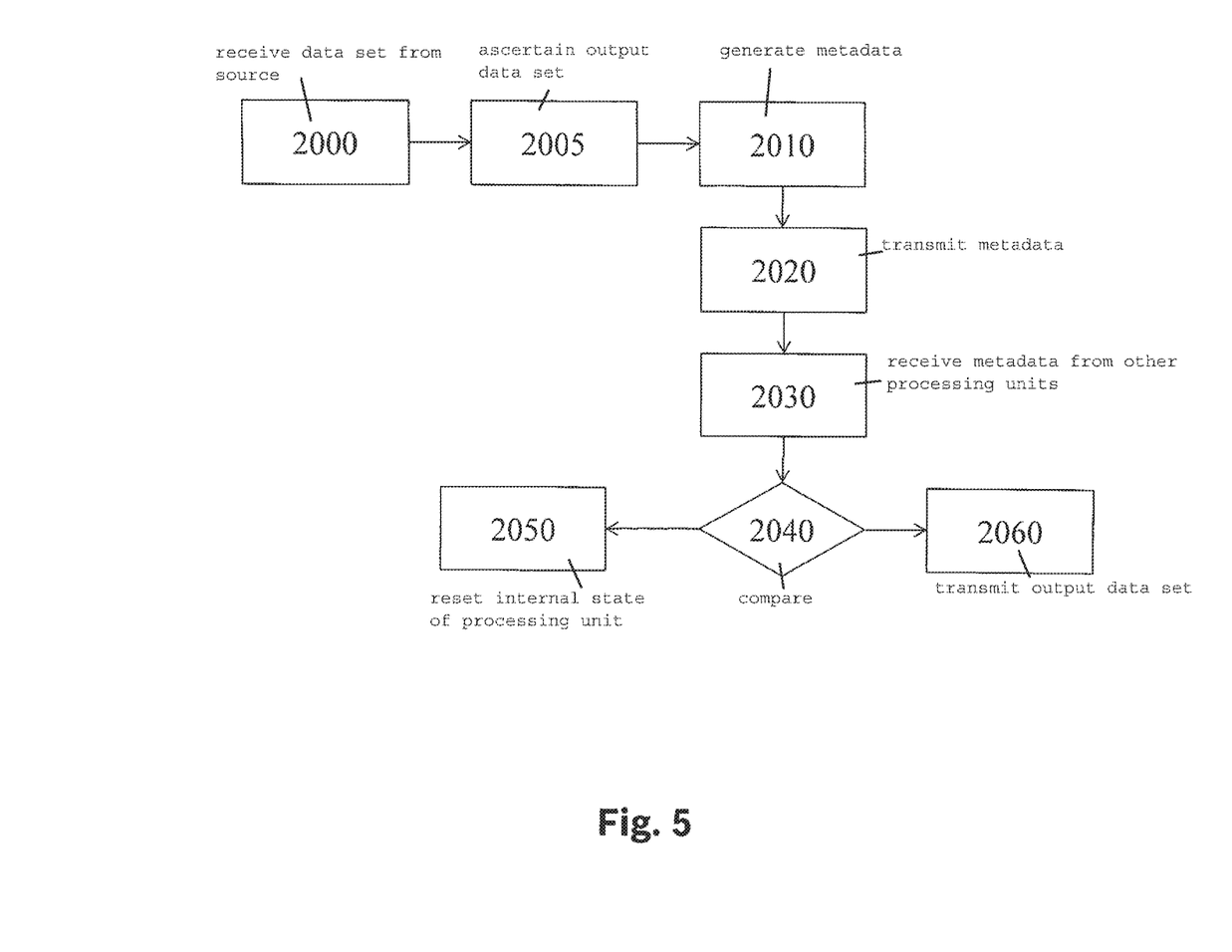
FIG. 5 shows the sequence of a method according to another specific embodiment of the present invention.

FIG. 5 shows a flow chart, which illustrates the sequence of the method according to a further aspect of the present invention. This method may be used in one or more of processing units 101, 102, 103, for example, in processing unit 101.

The method starts in step 2000. Processing unit 101 receives from source 100 the currently present data set, for example, D2.

In step 2005, processing unit 101 ascertains output data set E2 from data set D2. If data set D2 is missing or data set D2 is empty, processing unit 101 ascertains an empty, or no, output data set.

In the following, optional step 2010, processing unit 101 generates metadata to data set D2. For example, processing unit 101 generates a bit, as illustrated in FIGS. 2c and 2d, which indicates whether data set D2 is present.

In the following, optional step 2020, processing unit 101 transmits these metadata to the other processing units 102, 103.

In the following step 2030, processing unit 101 receives from the other processing units 102, 103 metadata, which describe their currently present data sets.

If the metadata are a bit, which indicates whether or not the information is present, in the following step 2040 processing unit 101 may decide, as a function of the value of this bit, whether step 2050 or 2060 follows. If the value of the bit of at least one of processing units 102, 103 is "0," step 2050 follows, otherwise step 2060.

If these metadata are a hash value, for example, which encodes the information in data set D2, processing unit 101 may compare, in step 2040, the metadata it has generated to data set D2 with the metadata received from processing unit 102, 103. If the comparison of its own metadata with the metadata received from another one of processing units 102, 103 results in that the metadata are different, step 2050 follows, otherwise step 2060.

In step 2050, the internal state of processing unit 101 is reset to the state that existed prior to the calculation of output data set E2 in step 2005. Processing unit 101 thereafter outputs no, or an empty, data set to comparator 104, and the method is terminated.

In step 2060, processing unit 101 transmits output data set D2 to comparator 104. If no, or an empty output, data set has been ascertained, processing unit 101 transmits to comparator 104 no, or the empty output, data set, thus terminating the method.

It is understood by those skilled in the art that this method may be implemented in software or in hardware or in a mixed form of software and hardware.

What is claimed is:

1. A method for generating an output data stream from an input data stream for an automated driving system of a vehicle, the method comprising:
   receiving, by a processing unit, a first input data stream including a first plurality of data sets;
   receiving, by the processing unit from a further processing unit, a second set of metadata, which describe a second plurality of data sets received by the further processing unit in a second input data stream of the further processing unit;
   determining, by the processing unit, based on the second set of metadata, which data sets of the first plurality of data sets were received by the further processing unit in the second input data stream;
   determining, by the processing unit, based on the second set of metadata, that at least one data set of the first plurality of data sets was not received by the further processing unit in the second input data stream;
   outputting into a first output data stream, by the processing unit to a comparator, for each data set of the first plurality of data sets, a respective output data set generated from the data set, the outputting of the respective output data set being only for those data sets of the first plurality of data sets that were determined, in the determining step, to have been received by the further processing unit;
   outputting nothing or an empty data set to the comparator into the first output data stream for each of the at least one data set of the first plurality of data sets that was not determined, in the determining step, to have been received by the further processing unit;
   comparing, by the comparator, the first output data stream from the processing unit with a second output data stream from the second processing unit, the second output data stream being generated by the further processing unit based on the second plurality of data sets;
   determining, based on the comparing, that the first output stream and the second output stream are not identical; and
   based on the determining that the first output stream and the second output stream are not identical, transferring the automated driving system of the vehicle into a safe mode.

2. A system for generating an output data stream from an input data stream for an automated driving system of a vehicle, comprising:
   at least two processing units, wherein at least one of the processing units is configured to perform the following tasks:

(a) receive a first input data stream including a first plurality of data sets, (b) receive from a further processing unit a second set of metadata, which describe a second plurality of data sets received by the further processing unit in a second input data stream of the further processing unit, (c) determine, based on the second set of metadata, which data sets of the plurality of data sets were received by the further processing unit in the first plurality of data sets, (d) output into a first output data stream to a comparator, for each data set of the first plurality of data sets, a respective output data set generated from the data set, the outputting of the respective output data set being only for those data sets of the first plurality of data sets that were determined, in (c), to have been received by the further processing, and (e) output nothing or an empty data set to the comparator into the first output data stream for each of the first plurality of data sets that was not determined, in (c), to have been received by the further processing unit; and a comparator that compares the first output data stream from the processing unit with a second output data stream from the further processing unit, the second output data stream being generated by the further processing unit based on the second plurality of data sets;

wherein, the system is configured to transfer the automated driving system of the vehicle into a safe mode if the first output stream is not identical to the second output stream based on the comparison by the comparator.

3. The method as recited in claim 1, wherein the processing unit transmits the first set of metadata to the further processing unit.

4. The method as recited in claim 1, wherein the processing unit and the further processing unit respectively receive the first data stream and the second data stream from the same source.

5. The system as recited in claim 2, wherein each of the processing units is designed to perform (a), (b), (c), (d) and (e).

6. The system as recited in claim 2, wherein the comparator outputs an error message and/or turns off the output data stream, when the first output data stream transmitted to it by the processing unit and the second output data stream transmitted to it by the further processing unit do not coincide.

7. The system as recited in claim 2, wherein the system includes a network over which the metadata are exchanged.

8. The method as recited in claim 1, wherein the transferring of the automated driving system of the vehicle into the safe mode includes deactivating a safety-critical function of the automated driving system.

9. The method as recited in claim 1, wherein the transferring of the automated driving system of the vehicle into the safe mode includes reducing a traveling speed of the vehicle.

10. The method as recited in claim 1, further comprising: controlling the automated driving system using the first output data stream.

11. The method as recited in claim 1, wherein to generate first output stream by the processing unit, and to generate the second output stream by the further processing unit, the processing unit and the further processing unit perform redundant calculations, relative to one another.

12. The system as recited in claim 2, wherein the transfer of the automated driving system of the vehicle into the safe mode includes deactivating a safety-critical function of the automated driving system.

13. The system as recited in claim 2, wherein the transfer of the automated driving system of the vehicle into the safe mode includes reducing a traveling speed of the vehicle.

14. The system as recited in claim 2, wherein the system controls the automated driving system using the first output data stream.

15. The system as recited in claim 2, wherein to generate first output stream by the processing unit, and to generate the second output stream by the further processing unit, the processing unit and the further processing unit perform redundant calculations, relative to one another.

16. A non-transitory machine-readable memory medium on which is stored a computer program, which is executable by a processor unit, comprising:

a program code arrangement having program code for generating an output data stream from an input data stream for an automated driving system of a vehicle, by causing the processing unit to perform the following:

receiving, by the processing unit, a first input data stream including a first plurality of data sets;

receiving, by the processing unit from a further processing unit, a second set of metadata, which describe a second plurality of data sets received by the further processing unit in a second input data stream of the further processing unit;

determining, by the processing unit, based on the second set of metadata, which data sets of the first plurality of data sets were received by the further processing unit in the second input data stream;

determining, by the processing unit, based on the second set of metadata, that at least one data set of the first plurality of data sets was not received by the further processing unit in the second input data stream;

outputting into a first output data stream, by the processing unit to a comparator, for each data set of the first plurality of data sets, a respective output data set generated from the data set, the outputting of the respective output data set being only for those data sets of the first plurality of data sets that were determined, in the determining step, to have been received by the further processing;

outputting nothing or an empty data set to the comparator into the first output data stream for each of the at least one data set of the first plurality of data sets that was not determined, in the determining step, to have been received by the further processing unit;

comparing, by the comparator, the first output data stream from the processing unit with a second output data stream from the second processing unit, the second output data stream being generated by the further processing unit based on the second plurality of data sets;

determining, based on the comparing, that the first output stream and the second output stream are not identical; and based on the determining that the first output stream and the second output stream are not identical, transferring the automated driving system of the vehicle into a safe mode.

* * * * *